United States Patent Office 3,184,321
Patented May 18, 1965

3,184,321
REFRACTORY COMPOSITION AND METHOD
Russell Pearce Heuer, Villanova, and Alex Edward Fitzgerald, Narberth, Pa., assignors to General Refractories Company, Philadelphia, Pa., a corporation of Pennsylvania
No Drawing. Filed Apr. 5, 1962, Ser. No. 185,204
3 Claims. (Cl. 106—58)

The present invention relates to refractory materials which can be applied by spraying to roofs and walls of high temperature furnaces, especially metallurgical furnaces, preferably while the furnace is operating at elevated temperature.

This application is a continuation-in-part of our co-pending U.S. application Serial No. 107,911, filed May 5, 1961, for Refractory Composition and Method, now abandoned.

A purpose of the inevntion is to prepare a basic refractory composition which has as its basis a refractory material of the class consisting of chrome ore, calcined magnesia and mixtures of chrome ore and calcined magnesia in any case containing in excess of 5% by weight of calcined magnesia, said mixture being capable of being mixed with water to form a suspension, and of being applied by a spray-gun to basic refractory surfaces of the class consisting of chrome ore, calcined magnesia and mixtures of calcined magnesia and chrome ore in any case containing in excess of 5% of calcined magnesia, said refractory having the property of adhering and bonding to the furnace refractory surfaces at elevated temperature or at room temperature.

A further purpose is to provide a basic refractory material intended for maintenance and repair of basic refractory surfaces with components which will aid greatly in the production of a good suspension in water for effective spraying, notwithstanding the high density of the refractory particles.

A further purpose is to include in the refractory composition materials which will promote adherence and bonding to the furnace walls even at operating temperatures of the furnace.

Further purposes appear in the specification and in the claims.

The present invention is particularly applicable to repairing and maintaining basic refractory surfaces of chromite, calcined magnesia or mixtures of calcined magnesia and chromite which in any case exceed 5% of calcined magnesia, and which forms parts of the refractory surface such as the walls and/or the roof of an open hearth steel furnace, copper refining furnace, or some other type of metallurgical furnace.

The chrome ore or chromite as referred to herein can be any acceptable refractory chromite such as one of the refractory chromites obtained from the Philippines, Cuba, Rhodesia, the Transvaal, India or Japan.

A typical refractory chromite (Philippine chrome ore) has the following analysis:

|  | Percent by weight |
|---|---|
| Ign. loss | 0.71 |
| $SiO_2$ | 4.62 |
| FeO | 13.38 |
| $Al_2O_3$ | 29.19 |
| CaO | 0.68 |
| MgO (by diff.) | 18.98 |
| $Cr_2O_3$ | 32.44 |
|  | 100.00 |

The calcined magnesia used may be calcined natural magnesite such as the calcined natural magnesite from Austria or Greece, or it may be calcined magnesium hydrate prepared from sea-water or from brine. A typical analysis of calcined magnesia obtained from Austria magnesite is as follows:

|  | Percent by weight |
|---|---|
| Ing. loss | 0.20 |
| $SiO_2$ | 0.40 |
| $Fe_2O_3$ | 5.79 |
| Ign. loss | 0.20 |
| $Al_2O_3$ | 0.31 |
| CaO | 5.76 |
| MgO (by dif.) | 87.54 |
|  | 100.00 |

The chrome ore where used and the magnesia is ground so that it has the following particle size distribution in the preferred embodiment:

|  | Percent by weight |
|---|---|
| On 48 mesh | 12 |
| On 100 mesh | 24 |
| On 200 mesh | 18 |
| On 325 mesh | 13 |
| Through 325 mesh | 33 |
|  | 100 |

In making up the preferred composition of the invention, chrome ore or the mixture of chrome ore and calcined magnesia is mixed in a dry state with from 1 to 6% by weight of bentonite, preferably through 200 mesh. Other bonding silicates or clay substances may be used instead of bentonite.

Incorporated with the mixture in the dry state is a dry bonding agent, anhydrous sodium metasilicate. This material is very desirable because it renders the composition easy to handle, makes a very effective bond with the basic refractory wall or roof of the furnace even at furnace operating temperature, and is quite economical. Sodium metasilicate has a mol ratio of $Na_2O:SiO_2$ of approximately one. Because of the properties enumerated, this is very advantageous as compared to conventional hydrous sodium silicate binders which have mol ratios in typical cases of 1:1.9 or 1:2.0 or 1:3.2. The amount of sodium metasilicate employed will vary between 1 to 10% of the weight of the dry refractory composition, preferably 2 to 8% and most desirably about 5%. The sodium metasilicate is added in finely divided form so that it can be widely distributed and will readily promote solution in water.

The refractory composition of the invention can be stored and shipped dry and prepared as a suspension when it is ready for use.

A suitable technique for processing the refractory composition preparatory for use is to introduce the refractory composition while agitating the required water in an open steel tank provided with power driven rotary blades. In the preferred embodiment about 25 pounds of water will be employed to make the final slurry per 100 pounds of refractory composition. The exact amount, however, is subject to the control of the operator in the light of the particular spray equipment to be used and the conditions of application. The mixing tank is preferably heated as by steam coils to maintain the mixture warm.

During the mixing the sodium metasilicate goes into solution and exhibits the property along with the bentonite where used of maintaining the refractory particles of chrome ore and/or calcined magnesia in suspension notwithstanding that they have a specific gravity which exceeds 3.0.

The dispersion is drained from the tank into a conventional refractory spray-gun. The spray-gun is transported to the furnace and a supply of compressed air is fitted to the gun. The air driven refractory suspension is directed to the desired refractory surface of the furnace, suitably the basic refractory roof or walls, by a pipe and nozzle attached to the gun. The basic refractory composition of the furnace will normally be chrome ore, calcined magnesia or a mixture of chrome ore and calcined magnesia in any case containing in excess of 5% of calcined magnesia.

The technique for applying the refractory composition to the furnace will vary with the furnace practice. In an open hearth steel furance, the spraying will normally be accomplished between heats while the refractory of the furnace is at high temperature. The frequency of spraying will depend upon the severity of the service of the furnace, and spraying may be done daily or more frequently.

Certain parts of the furnace which have worn unusually thin may be sprayed more frequently than others and some parts of the furnace may require little or no spraying. The quantity of refractory applied in a given spray application may be as much as 1000 pounds or more.

The refractory composition of the invention will adhere to the basic roof, front wall, back wall, end wall, and other basic refractory surfaces of the furnace, despite the fact that such roof and walls may be coated with a built-up accretion from the furnace charge which may contain 50% or more of iron oxide.

The percentages referred to herein are percentages by weight.

The following table gives examples of typical analyses of compositions which may be employed in the present invention. Examples 1, 2 and 3 are preferred, respectively, where the refractory is entirely chrome or, entirely dead-burned magnesite or a mixture of chrome ore and dead-burned magnesite respectively. Examples 4, 5 and 6 give alternate compositions which may less desirably be used.

| Components | Mix 1, percent | Mix 2, percent | Mix 3, percent | Mix 4, percent | Mix 5, percent | Mix 6, percent |
| --- | --- | --- | --- | --- | --- | --- |
| Philippine Chrome Ore | 90.5 | | 71.5 | 88 | 87 | 60 |
| Dead-burned magnesite | | 90.0 | 20.0 | | | 31 |
| Anhydrous sodium metasilicate | 5.5 | 6.0 | 4.5 to 5.5 | 7 | 8 | 6 |
| Bentonite | 4.0 | 4.0 | 3 to 4 | 5 | 5 | 3 |

The screen sizes referred to herein are Tyler standard mesh per linear inch.

In view of our invention and disclosure, variations and modifications to meet individual whim or particular need will doubtless become evident to others skilled in the art, to obtain all or part of the benefits or our invention without copying the process and method shown, and, we, therefore, claim all such insofar as they fall within the reasonable spirit and scope of our claims.

Having thus described our invention what we claim as new and desire to secure by Letters Patent is:

1. A refractory composition suitable for mixing with water and spraying on and adhering to refractory walls of high temperature furnaces during furnace operation at elevated temperature, which consists essentially of a mixture of basic refractory of the class consisting of chrome ore, calcined magnesia and mixtures thereof containing in excess of 5% of calcined magnesia, and from 1 to 10% of the weight of the mixture of anhydrous sodium silicate having a mol ratio of $Na_2O:SiO_2$ of approximately one.

2. A refractory composition of claim 1, containing from 1 to 6% of the weight of the mixture of bentonite.

3. A method of maintaining in operating condition the basic refractory walls and/or roofs of open hearth steel furnaces having refractory of the class consisting of chrome ore, calcined magnesia and mixtures of calcined magnesia and chrome ore in any case containing in excess of 5% calcined magnesia, which comprises spraying said refractory surfaces of the furnace while the furnace is still in operation at elevated temperature with a suspension in water of a refractory composition composed of basic refractory of the class consisting of chrome ore, calcined magnesia and mixtures thereof in any case containing in excess of 5% calcined magnesia and from 1 to 10% on the weight of the mixture of anhydrous sodium silicate having a mol ratio of $Na_2O:SiO_2$ of approximately one, and bonding the sprayed refractory to the refractory of the furnace by the action of the heat of the furnace.

References Cited by the Examiner

UNITED STATES PATENTS 2,809,126  10/57  Murphy et al. _____ 106—66
3,047,411  7/62   Chantler et al. _____ 106—58

FOREIGN PATENTS 816,233  7/59  Great Britain.

TOBIAS E. LEVOW, *Primary Examiner.*

JOHN H. MACK, *Examiner.*